TONE GENERATOR

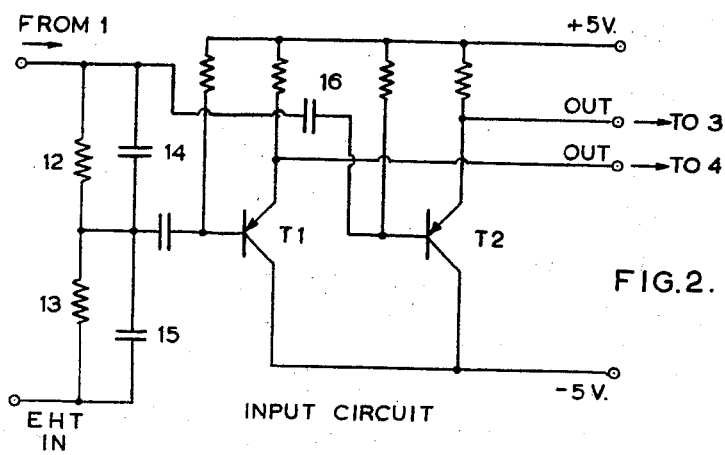
FIG.2. INPUT CIRCUIT
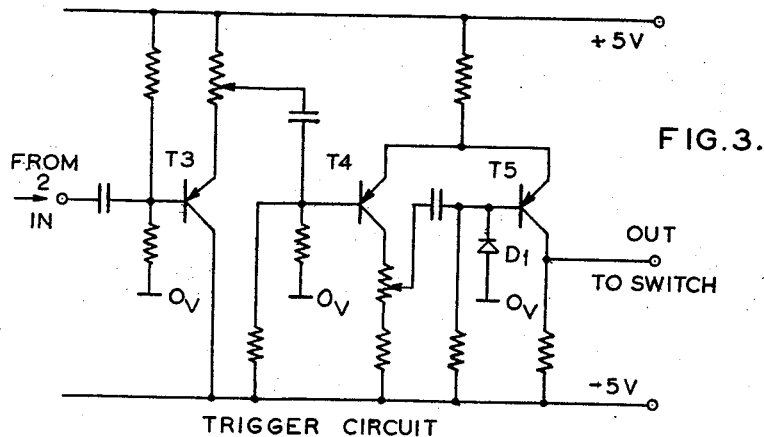
FIG.3. TRIGGER CIRCUIT
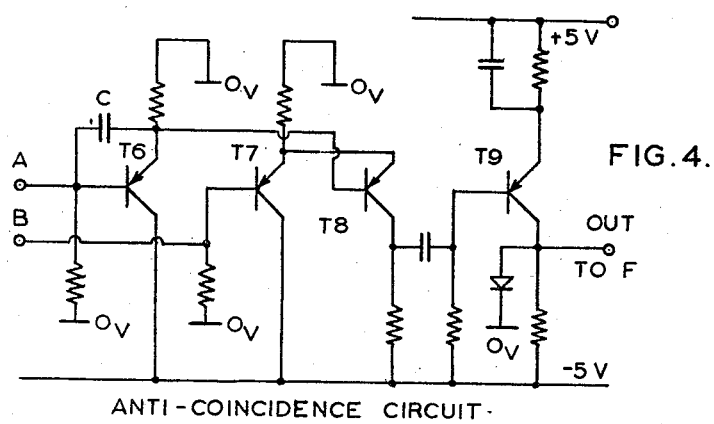
FIG.4. ANTI-COINCIDENCE CIRCUIT

United States Patent Office 3,126,482
Patented Mar. 24, 1964

3,126,482
RADIO-ACTIVITY CONTAMINATION MONITOR WITH DISCRIMINATION MEANS FOR ALPHA AND BETA RADIATION
James Robert Brown, Ashford, and Jack Sharpe, Oxhey, England, assignors to Electric & Musical Industries Limited, Hayes, Middlesex, England, a company of Great Britain
Filed Oct. 3, 1960, Ser. No. 59,889
Claims priority, application Great Britain Oct. 6, 1959
2 Claims. (Cl. 250—83.3)

This invention relates to radio activity contamination monitors.

The object of the present invention is to provide a radio activity contamination monitor which is capable of providing an indication of the presence and quantity of radio active particles of different forms emanating from selected contaminated areas for example benches and clothing.

According to the present invention there is provided a radio activity contamination monitor adapted to respond to $\alpha$ and $\beta$ radiations and means for producing audibly distinguishable signals in response respectively to said $\alpha$ and $\beta$ radiations.

According to one aspect of the present invention there is provided a radio activity monitor comprising a detector for producing electrical impulses of different amplitudes in response to atomic radiations of different masses, means for separating electrical impulses produced by radiation of one mass from electrical impulses produced by radiation of a different mass to obtain separate indications of the density of radiation in said different masses.

In order that the present invention may be clearly understood and readily carried into effect one example of an embodiment of the invention will be described with reference to the accompanying drawings of which:

FIGURE 2 illustrates the input circuit of the embodiment shown in FIGURE 1,

FIGURE 3 illustrates a trigger circuit suitable for use in the embodiment shown in FIGURE 1, FIGURE 4 illustrates the anti-coincidence circuit suitable for use in the embodiment shown in FIGURE 1.

Figure 1:
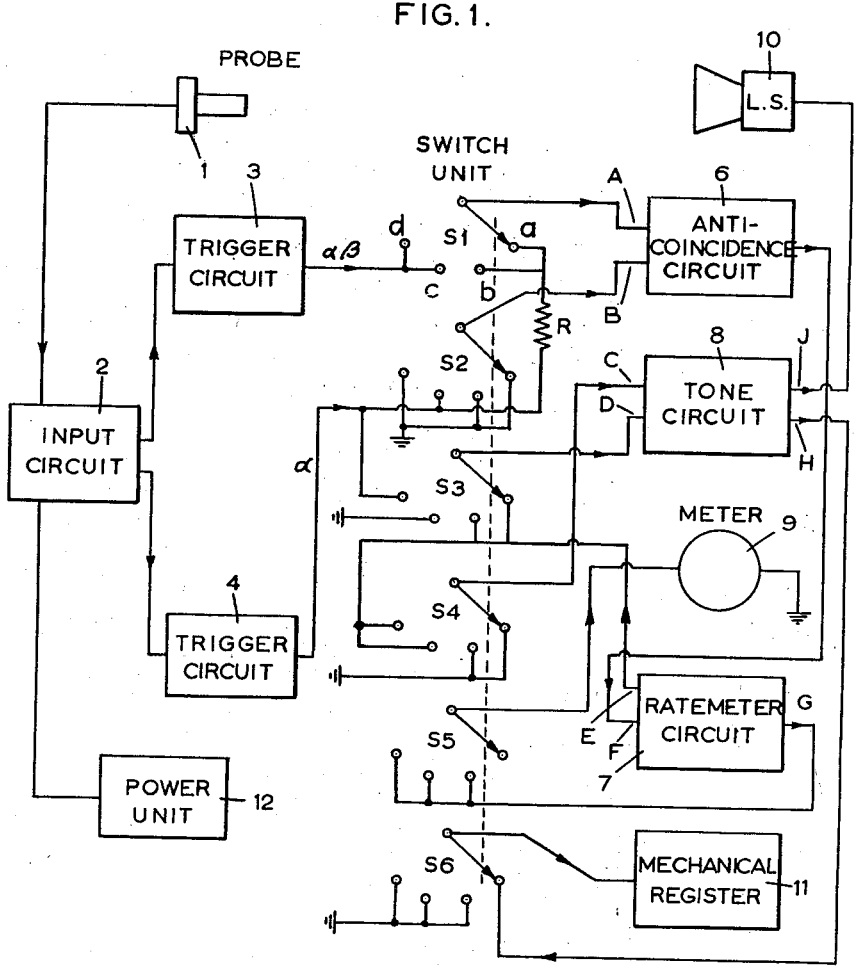
FIGURE 1 illustrates mainly in block form the embodiment about to be described.

Referring to FIGURE 1, the detecting probe for $\alpha$ and $\beta$ radiations is represented by reference 1. This probe is preferably of the dual phosphor scintillation counter type and produces output pulses corresponding to individual $\alpha$ and $\beta$ particles which enter the sensitive region of the probe. In the present example of the invention the probe comprises a layer of zinc sulphide disposed in front of a thicker layer of plastic phosphor so that $\alpha$ particles having a much greater specific ionisation than the $\beta$ particles are arrested in the zinc sulphide layer to produce light scintillations which are transmitted by the transparent plastic phosphor to be detected by the photo cathode of a photo multiplier. The $\beta$ particles with low specific ionisation pass through the zinc sulphide layer without substantial loss of energy and are arrested in the plastic phosphor where the loss of energy causes further light scintillations which are also detected by the photo cathode of the photo multiplier mentioned above.

In the present embodiment of the invention, use is made of the fact that with the type of probe described above the electrical pulses corresponding to $\alpha$ particles are of substantially greater magnitude than pulses corresponding to $\beta$ particles. As will be appreciated hereafter, by transmitting signals derived from the probe along one channel without substantial attenuation and transmitting the same signals along another channel with a predetermined degree of attenuation, trigger circuits receiving the signals from each channel can be arranged to be triggered in the one case by pulses corresponding to $\alpha$ and $\beta$ particles and in the other case only by $\alpha$ particles. Subtraction between the outputs of the said trigger circuits enables pulses corresponding to $\alpha$ particles and $\beta$ particles to be presented in separate channels.

Signal pulses derived from the probe 1 are applied to the input terminal of an input circuit 2 which is arranged to feed signals representing $\alpha$ and $\beta$ particles to two trigger circuits 3 and 4, the signal applied to 4 being attenuated in the ratio 12:1 as compared with the signal applied to 3. The output signals derived from 3 and 4 are applied to a switch unit which comprises six switches S1, S2, S3, S4, S5 and S6. Each of these switches has four fixed contacts and a further single contact movable to engage with one or other respectively of the four fixed contacts, the movable contacts being ganged together as indicated. The four movable contacts of S1 denoted in FIGURE 1 by references $a$, $b$, $c$ and the positions of the other switches S2 to S6 corresponding to these contacts will also subsequently be referred to by these references. Thus the output from 3 is connected to contacts $c$ and $d$ of S1 whereas the output of 4 is connected to the contact $d$ of S3, $c$ of S2 and via a resistor R to contacts $a$ and $b$ of S1. Fixed contacts $a$, $b$ and $d$ of S2 are all earthed as is the fixed contact $c$ of S3, the contacts $a$ and $b$ of S4 and the contacts $b$, $c$ and $d$ of S6.

Associated with the switch unit is an anti-coincidence circuit 6, which provides the aforementioned subtraction between the signals derived from 3 and 4, a rate meter circuit 7, a tone circuit 8 which produces in a loudspeaker 10 different sounds representing $\alpha$ and $\beta$ particles, an electrical meter 9 and a mechanical register 11. The circuits of blocks 2, 3, 4, 6, 7 and 8 are described in greater detail hereafter with reference to FIGURES 2, 3, 4, 5 and 6.

The movable contact S1 is connected to the input terminal A of the anti-coincidence circuit 6 and the movable contact of the switch S2 is connected to the input terminal B. The output terminal of 6 is connected to the terminal F of the rate meter circuit 7. Movable contacts of S3 and S4 are connected to the input terminals D and C of the tone generator circuit 8 one output terminal of which is connected direct to the loudspeaker 10 and the other output terminal being connected to the fixed contact $a$ of S6. The movable contacts of S5 and S6 are connected respectively to the meter 9 and the mechanical register 11. In addition to the above connections the terminal E of the rate meter circuit is connected to the fixed contacts $a$, $b$ of S3 and $c$ and $d$ of S4, the output terminal G of the rate meter circuit being connected to the fixed contacts $b$, $c$ and $d$ of S5.

Before operation of the arrangement of FIGURE 1 is described in detail the circuits connected with certain of the blocks shown in FIGURE 1 will be further described. Thus the input circuit 2 is shown in FIGURE 2 and comprises a potentiometer consisting of resistors 12 and 13 and capacitors 14 and 15, across which the input pulses derived from the probe 1 are applied. These pulsese are also applied via a coupling capacitor 16 to the base of a transistor T2. The junction of 12 and 13 which is common to the junction of 14 and 15, is connected via a further coupling capacitor 17 to the base of a further transistor T1. The transistors T1 and T2 are connected to operate as emitter followers but by virtue of the step down effect of the potentiometer comprising 13 and 14, the signal amplitude of pulses applied to the base of T1 is attenuated relative to that of pulses applied to the base of T2. The outputs of T1 and T2 which, as shown, are derived from the emitters thereof, are applied to output terminals which are connected respectively to the identical trigger circuits 3 and 4 shown in FIGURE 1.

The trigger circuits 3 and 4 are adjusted to have triggering thresholds which are so chosen in relation to the attenuation produced by the potentiometer of the input circuit 2, that 3 is triggered in response to pulses representing $\alpha$ particles and $\beta$ particles but owing to the said attenuation the circuit 4 is only triggered by the higher amplitude pulses, namely those corresponding to $\alpha$ particles.

Referring to FIGURE 3, the trigger circuits 3 and 4 each comprise three transistors T3, T4 and T5 of which the transistor T3 forms a biased emitter follower valve driving a conventional two state device formed by the transistors T4 and T5, to produce a square wave at the collector electrode of T5. The signal applied to the base of T4 is derived from a movable contact at a potentiometer P1 which forms the emitter resistor for the transistor T3 so that the two state device may be triggered at a signal level which depends on the setting of this movable contact. The base of T5 is connected via a diode D1 to a point of zero reference potential to limit the amplitude of output pulses by holding the effective input signal to the base of T5 below a predetermined level. The bias at the transistor T3 for each of the trigger circuits 3 and 4 is adjusted by P1 to be substantially equal so that as aforementioned the circuit A is triggered by pulses corresponding to $\alpha$ and $\beta$ particles whereas the circuit 4 is triggered only by pulses corresponding to $\alpha$ particles.

The anti-coincidence circuit represented by block 6 in FIGURE 1 is illustrated in FIGURE 4. In FIGURE 4, the input terminal A is connected to the base electrode of a transistor T6 and the input terminal B is connected to the base electrode of a transistor T7, both transistors being connected to operate as emitter followers. The emitter electrode of T6 is thus connected to the base electrode of a further transistor T8, the emitter electrode of which is connected to the emitter electrode of T7. The collector electrode T8 is capacitively coupled to the base electrode of a further transistor T9 which operates as an emitter follower, the emitter electrode being connected to the output terminal which is directly connected to the input terminal F of the rate meter circuit 7 of FIGURE 1. By virtue of the connections between the base and emitter electrodes of T8 and the emitter electrodes of emitter followers T6 and T7 it is arranged that the output signal derived from the collector electrode of T8 represents the difference between signals applied at the input terminals A and B. Again a diode is connected from the emitter electrode of T9 to a point of zero reference potential in order that the output pulses derived from T9 are limited and clearly defined.

By virtue of the fact that the input circuit 2 produces different degrees of attenuation in the signals which are applied to trigger circuits 3 and 4 and since the pulses representing $\alpha$ particles are not truly rectangular but have sloping leading edges, there is a relative time delay between the triggering of circuits 3 and 4 corresponding to the same pulse derived from 1 and consequently the same time delay is endowed in the signals appearing at A and B corresponding to $\alpha$ particles. In order that this delay may be compensated for and output pulses may be derived from the anti-coincidence circuit representing $\beta$ particles when pulses representing $\alpha$ and $\beta$ particles are applied to A and pulses representing $\alpha$ particles only are applied to B, a capacitor C is connected between the emitter electrode and the base electrode of the transistor T6.

Figure 5:
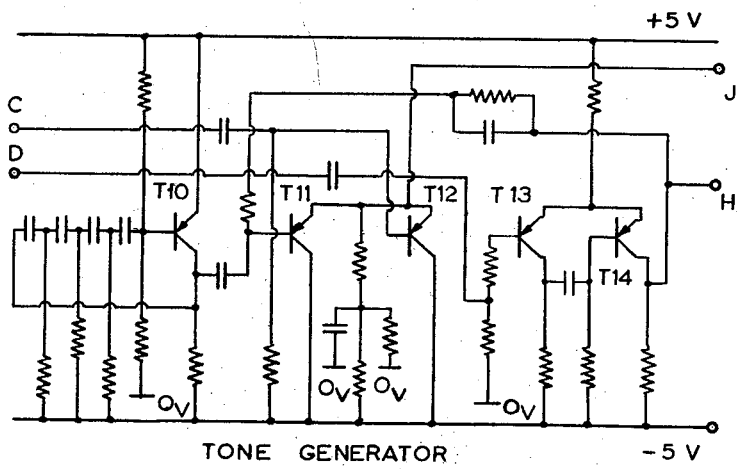
FIGURE 5 illustrates a tone generator circuit suitable for use in the embodiment shown in FIGURE 1

The tone generator circuit 8 in FIGURE 1 is shown in detail in FIGURE 5. Referring to FIGURE 5, the transistor T10 with the associated circuit components forms an oscillator, the frequency of which is so chosen in the audio range that short bursts of oscillations give the sensation of squeaks when applied to the loudspeaker 10. The input terminal D of the circuit is connected to an intermediate point at a potentiometer connected to the base of a transistor T13 which has an emitter connection common with the adjacent transistor T14. Transistors T13 and T14 form a monostable circuit in which T14 is normally conducting and the circuit connections are such that when T14 is conducting a further transistor T11 is biased into its normal conducting state. Oscillations generated in T10 are applied via T11 to the output electrode which is connected to the loudspeaker. The emitter electrode of T11 is connected in common with the emitter electrode of a further transistor T12 the base of which is coupled to the input terminal C of the circuit. Thus on application of negative pulses to the input terminal D the monostable circuit comprising T13 and T14 is switched to its unstable state and oscillations are transmitted from T10 to the output terminal J for the duration of the period in which the monostable circuit remains in its unstable state. Furthermore, on application of a negative pulse to the input terminal C the transistor T12 produces a corresponding pulse at the output terminal J. Thus negative input pulses at C give rise to clicks in the loudspeaker and negative input pulses at D give rise to squeaks in the loudspeaker.

Figure 6:
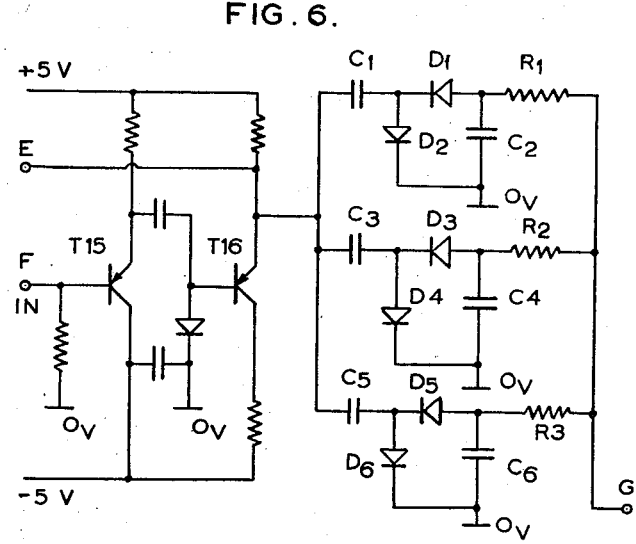
FIGURE 6 illustrates a rate meter circuit suitable for use in the embodiment shown in FIGURE 1.

The rate meter circuit 7 is illustrated in detail in FIGURE 6. In FIGURE 6 the two transistors T15 and T16 comprise emitter follower amplifiers connected in series, input signals being applied to the input terminal F. The circuit has two output terminals, namely E and G, of which E is connected directly to the emitter T16 and G is connected via a parallel arrangement of three diode pump circuits to the emitter of 16. The said diode pump circuits comprise pairs of diodes D1 and D2, D3 and D4 and D5 and D6 respectively, pairs of capacitors C1 and C2, C3 and C4 and C5 and C6 respectively and load resistors R1, R2 and R3. The purpose of the parallel diode pump circuits is to provide a D.C. output signal of substantial logarithmic form so that the meter 9 may be calibrated according to a logarithmic scale of representation and thereby avoid the necessity to provide a range change switch. This is permissible since reading accuracy of the meter scale is required to be relatively high for low count rates of $\alpha$ and $\beta$ particles but can be relatively low for high count rates. The capacitors C1 and C3 and C5 may be termed feed capacitors and in the present example C1>C3>C5 and C2, C4 and C6 may be termed reservoir capacitors and are such that C2>C4>C6. The load resistors R1, R2 and R3 are all substantially equal. Considering the diode pump circuit comprising D1, D2 and R1, on application of negative pulses from the emitter of T16, the feed capacitor determines the charge per pulse applied to C1 and the reservoir capacitor C2 which tends to charge up in a stepwise fashion via D1. At the same time, C2 tends to discharge via R1 and the meter 9 when the meter is connected at the point G to form a part to earth. The current flowing via R1 and the meter is therefore proportional to the rate of application of pulses from T16. The operation of all three diode pump circuits is the same, but since C2>C4>C6, the rate of fall of voltage across C2 is less than that for C4, which in turn is less than that for C6. Therefore for relatively low count rates the discharge current from C2 predominates the discharge currents from C4 and C6 being relatively insignificant whereas for relatively higher count rates the discharge given from C4 becomes of greater significance and for even higher count rates, the discharge current from C6 is of greater significance. The values of the capacitors in the diode circuits are so chosen to give a logarithmic scale of count rate representation of the meter 9.

Referring now to FIGURE 1, when the switch unit comprising S1, S2 . . . S6 is set to the position indicated in the drawing negative pulses corresponding to α particles detected by the probe 1 are derived from the trigger circuit 4 and applied via resistor R and the movable contact of S1 to the terminal A of 6. The pulses which are derived from the output terminal of the anti-coincidence circuit therefore correspond to α particles and are applied to the terminal F of the rate meter circuit and after being amplified therein by transistors T15 and T16 these pulses are applied via the terminal E the movable contact of S3, 8, and the movable contact of S6 to the input terminal of the mechanical register 11. The mechanical register comprises the electro-mechanical device of known form capable of counting up to say a maximum of 10 pulses per second and of registering the number counted. This facility enables the count rate for α particles to be recorded assuming that the rate is not more than 10 particles per second.

In the position of the movable contacts of the switch in which the movable contacts engage fixed contacts $b$, again pulses corresponding to α particles are applied via the resistor R, the terminal A of the anti-concidence circuit 6, the rate meter circuit 7 and the movable contact of S3 to the tone generator circuit to give rise to squeaks in the loudspeaker 10. Furthermore, the output derived from the terminal G is applied via S5 to the meter 9 which therefore gives an indication of the count rate for α particles sensed by 1. Since the movable contact S4 is earthed in the positions mentioned so far no clicks are produced at the loudspeaker with the switch in either of these positions.

When the switch is set so that the movable contacts engage with the fixed contacts $c$, pulses corresponding to α particles and β particles detected by the probe 1 are applied via the trigger circuit 3 and the movable contact 3 of S1 to the input terminal A of 6 and pulses corresponding to α particles only detected by the probe 1 are applied via the movable contact of S2 to the input terminal B of 6. Consequently subtraction occurs in 6 as described above and pulses appearing at the output terminal E of 7 are applied via the movable contact of S4 to the input terminal C of 8. In this case these pulses correspond to β particles and give rise to clicks in the loudspeaker 10. Terminal D in this case is earthed so that no squeaks are produced. Furthermore, the output derived from the terminal G of the rate meter circuit is applied via the switch S5 to the meter 9 which therefore gives an indication of the count rate for β particles.

When the movable contacts of the switch are set to engage with the fixed contacts $d$, the input terminal A of the anti-coincidence circuit receives pulses corresponding to α and β particles derived from the probe 1 but the input terminal B of the anti-coincidence circuit is earthed. Output pulses derived from 6 therefore represent α particles and β particles and a corresponding indication is produced at the meter 9. However, it will be noted that the output signal derived at the terminal E of the rate meter circuit is now applied via the movable contact of S4 to the input terminal C of the tone generator circuit and therefore gives rise to clicks in the loudspeaker corresponding to α and β particles and since the output signal derived from 4 is applied directly via the movable contact of S3 to the input terminal D of 8, squeaks are produced in the loudspeaker corresponding to α particles.

To summarise and referring to the switch positions as $a$, $b$, $c$ and $d$ as appropriate, position $a$ gives mechanical registration in 11 of α particles and produces squeaks corresponding to α particles, position $b$ gives squeaks corresponding to α particles and a meter indication at 9, position $c$ gives clicks corresponding to β particles and the meter indication at 9, and finally, position $d$ gives clicks corresponding to α and β particles, squeaks corresponding to α particles and a meter indication at 9 corresponding to α and β particles. It will be appreciated, however, that a click appearing at the front edge of a squeak is lost to the ear so that those sounds which are actually heard with the switch in position $d$ are such that squeaks correspond to α particles and clicks corresponds to β particles.

What we claim is:

1. A radio-activity monitor comprising a radiation sensitive detector for producing pulses in one amplitude range in response to alpha radiations and for producing pulses in another amplitude range in response to beta radiations, means for producing a pulse in a first channel in response to pulses in both said amplitude ranges and for producing a pulse in a second channel in response only to impulses in said one amplitude range, anti-coincidence circuit having first and second input terminals and an output terminal, said anti-coincidence circuit being arranged to produce output pulses only in response to input pulses applied to the first input terminal when no simultaneous pulse is applied to said second input terminal, a tone circuit having first and second input terminals and an output terminal and arranged to a produce a pulse in response to a pulse applied to its first input terminal, and to produce a burst of audio frequency oscillation in response to a pulse applied to its second input terminal, a sound transducer connected to the output terminal of said tone circuit, a switch having one condition in which said first and second channels are connected respectively to said first and second input channels of said anti-coincidence circuit and the output terminal of said anti-coincidence circuit is connected to one input terminal of said tone circuit, no signal being applied to the other input terminal of said tone circuit in said first condition of said switch, and said switch having a second condition in which said first and second channels are connected respectively to the first and second input terminals of said tone circuit.

2. A radio-activity monitor according to claim 1, said switch having a third condition in which said second channel is connected to one terminal of said tone circuit, no signal being applied to the other terminal of said tone circuit.

References Cited in the file of this patent

UNITED STATES PATENTS

| | | |
|---|---|---|
| 2,716,523 | Driver | Aug. 30, 1955 |
| 2,727,154 | Goldsworthy | Dec. 13, 1955 |
| 2,822,479 | Goldsworthy | Feb. 4, 1958 |
| 2,910,592 | Armistead | Oct. 27, 1959 |
| 2,963,588 | Wilson | Dec. 6, 1960 |